US011254835B2

(12) United States Patent
Johansson et al.

(10) Patent No.: US 11,254,835 B2
(45) Date of Patent: Feb. 22, 2022

(54) HALOGEN-FREE DECORATIVE HOMOGENEOUS SURFACE COVERINGS

(71) Applicant: Tarkett GDL, Lentzweiler (LU)

(72) Inventors: Helena Johansson, Sturkö (SE); Roland Karlsson, Listerby (SE); Stefan Karlsson, Ronneby (SE); Nils Wallnäs, Sölvesborg (SE)

(73) Assignee: Tarkett GDL, Lentzweiler (LU)

( * ) Notice: Subject to any disclaimer, the term of this patent is extended or adjusted under 35 U.S.C. 154(b) by 0 days.

(21) Appl. No.: 17/060,962

(22) Filed: Oct. 1, 2020

(65) Prior Publication Data
US 2021/0017416 A1 Jan. 21, 2021

Related U.S. Application Data

(63) Continuation of application No. 15/573,968, filed as application No. PCT/EP2016/061002 on May 17, 2016, now abandoned.

(30) Foreign Application Priority Data

May 18, 2015 (EP) .................... 15167990

(51) Int. Cl.
| | |
|---|---|
| C09D 153/02 | (2006.01) |
| C08L 53/02 | (2006.01) |
| B29C 43/00 | (2006.01) |
| C08L 75/04 | (2006.01) |
| C09D 5/29 | (2006.01) |
| C09D 175/04 | (2006.01) |
| E04F 15/10 | (2006.01) |
| E04F 13/18 | (2006.01) |
| B29C 43/24 | (2006.01) |
| B29K 21/00 | (2006.01) |
| B29K 75/00 | (2006.01) |
| B29K 105/00 | (2006.01) |

(52) U.S. Cl.
CPC .......... *C09D 153/02* (2013.01); *B29C 43/003* (2013.01); *C08L 53/02* (2013.01); *C08L 75/04* (2013.01); *C09D 5/29* (2013.01); *C09D 175/04* (2013.01); *E04F 13/18* (2013.01); *E04F 15/10* (2013.01); *E04F 15/105* (2013.01); *B29C 43/24* (2013.01); *B29K 2021/003* (2013.01); *B29K 2075/00* (2013.01); *B29K 2105/0032* (2013.01); *B29K 2105/0044* (2013.01); *B29K 2995/0021* (2013.01); *B32B 2471/00* (2013.01); *C08L 2207/04* (2013.01)

(58) Field of Classification Search
CPC ........ C08L 53/02; C08L 53/025; C08L 75/04; B29K 2995/0021; C09D 153/02
See application file for complete search history.

(56) References Cited

U.S. PATENT DOCUMENTS

| | | |
|---|---|---|
| 4,379,190 A | 4/1983 | Schenck |
| 4,403,007 A | 9/1983 | Coughlin |
| 4,438,228 A | 3/1984 | Schenck |
| 5,409,986 A | 4/1995 | Boudry et al. |
| 5,910,540 A | 6/1999 | Takahashi |
| 6,187,424 B1 | 2/2001 | Kjellqvist et al. |
| 6,214,924 B1 | 4/2001 | Bieser et al. |
| 6,458,863 B1 | 10/2002 | Yoshimura et al. |
| 2002/0168500 A1 | 11/2002 | Graab et al. |
| 2003/0017223 A1 | 1/2003 | Tasaka et al. |
| 2005/0065311 A1 | 3/2005 | Agrawal |
| 2005/0261427 A1 | 11/2005 | Saito |
| 2008/0053335 A1 | 3/2008 | Gustafsson et al. |
| 2010/0055358 A1 | 3/2010 | Weaver et al. |
| 2010/0174027 A1 | 7/2010 | Sasaki et al. |
| 2011/0305886 A1 | 12/2011 | Phan et al. |

FOREIGN PATENT DOCUMENTS

| | | |
|---|---|---|
| CN | 104371247 A | 2/2015 |
| EP | 0 257 796 B1 | 3/1992 |
| EP | 0 850 272 B1 | 4/1999 |
| EP | 0 742 098 B1 | 5/2002 |
| EP | 1 361 249 B1 | 8/2006 |
| EP | 1 611 201 B1 | 8/2007 |
| EP | 1 389 519 B1 | 5/2011 |
| JP | S60-92342 A | 5/1985 |
| JP | H06-128402 A | 5/1994 |
| JP | H07-125145 A | 5/1995 |
| JP | H09-32258 A | 2/1997 |
| JP | H09-302903 A | 11/1997 |

(Continued)

OTHER PUBLICATIONS

Database WPI, Week 200962, Thomson Scientific, London, GB; AN 2009-N62127 XP002749245; & JP 2009 209273 A (Aron Kasei KK); Sep. 17, 2009 (as referenced on Search Report submitted herewith).

(Continued)

*Primary Examiner* — Jeffrey C Mullis

(74) *Attorney, Agent, or Firm* — Reinhart Boerner Van Deuren P.C.

(57) ABSTRACT

Halogen-free decorative surface covering compositions comprising a polymer blend, the polymer blend comprising:
a) at least one thermoplastic elastomer, the thermoplastic elastomer being a block copolymer comprising hard and soft sequences, wherein the hard sequence is a (co)polymer of one or more vinyl aromatic monomer(s) and wherein the soft sequence is a (co)polymer of one or more alkylene(s) or of a mixture of one or more alkylene(s) and one or more vinylaromatic monomers;
b) at least one thermoplastic polyurethane.

18 Claims, No Drawings

(56) References Cited

FOREIGN PATENT DOCUMENTS

| | | |
|---|---|---|
| JP | H11-48416 A | 2/1999 |
| JP | 2000-045187 A | 2/2000 |
| JP | 2000-063732 A | 2/2000 |
| JP | 2002-276141 A | 9/2002 |
| JP | 2004-168860 A | 6/2004 |
| JP | 2009/209273 A | 9/2009 |
| TW | I290568 B | 12/2007 |
| WO | WO 2006/005752 A1 | 1/2006 |
| WO | WO 2008/083973 A1 | 7/2008 |
| WO | WO 2009/071549 A1 | 6/2009 |
| WO | WO 2014/096336 A1 | 6/2014 |

OTHER PUBLICATIONS

Database WPI, Week 201529, Thomson Scientific, London, GB; AN 2015-23858X XP002749246; & CN 104 371 247 A (Suzhou New District Fengsheng Plastic); Feb. 25, 2015 (as referenced on Search Report submitted herewith).

HALOGEN-FREE DECORATIVE HOMOGENEOUS SURFACE COVERINGS

CROSS-REFERENCE TO RELATED PATENT APPLICATIONS

This patent application is a continuation of co-pending U.S. patent application Ser. No. 15/573,968, filed Nov. 14, 2017, which is a 371 national stage entry of PCT Application No. PCT/EP2016/061002, filed May 17, 2016, the entire teachings and disclosure of which are incorporated herein by reference thereto; and which claims the benefit of European Patent Application No. 15167990.9, filed May 18, 2015, the entire teachings and disclosure of which are incorporated herein by reference thereto.

FIELD OF THE INVENTION

The present invention is related to a homogeneous (HO) halogen-free decorative floor, wall or ceiling coverings. The invention is further related to a method for the production of floor, wall or ceiling coverings.

STATE OF THE ART

Materials for floor, wall and ceiling coverings should possess a wide variety of properties. Particularly important for materials used for floor coverings are good wear, abrasion, scratch and indentation resistance and good indentation recovery to reduce visible scratches and indentations of furniture and rolling objects, such as office chairs.

Well known floor coverings are based on polyvinyl chloride (PVC). PVC-based materials have many desirable properties, such as good filler acceptance, flexibility and scratch resistance. However, in more recent years attention has been focused on the disadvantages of PVC-based flooring.

Typical homogeneous PVC surface floor coverings include S-PVC, plasticizer, stabilizer, inorganic filler and pigments. The floor coverings could be produced in extruders in combination with roller mill or belt press.

The use of metal stabilizers (e.g. calcium and zinc) is especially important to avoid degradation of the PVC polymer.

The hydrogen chloride and metal ash from decomposition of the metal stabilizers are undesired consequences from the incineration of scrap associated with manufacturing and installation of PVC-based covering materials.

Consequently, even though PVC offers an excellent mechanical, acoustic and heat insulation compromise in its application to floor coverings, the manufacturers of these coverings have been looking for a substitute for it, providing an answer to the following three points of concern:
- releasing no toxic gas when burnt, such as chlorine, hydrochloric acid, sulfur dioxide or nitrogen oxides;
- having properties, especially mechanical properties and fire resistance, of the same order as those obtained today with PVC;
- being capable of processing or fabrication on existing equipment, especially by extrusion, calendering, and the like.

In recent years, olefin based decorative surface covering materials have become popular and already have been subject of a considerable number of patents.

PVC-free floor and wall coverings for example are disclosed in EP 0257796 (B1), EP 0742098 (B1), EP 0850272 (B1), EP1611201 (B1), U.S. Pat. Nos. 4,379,190, 4,403,007, 4,438,228, 5,409,986, 6,214,924, 6,187,424, US 2011/ 0305886, JP 2004168860, JP 2002276141, JPH 07125145, JPH 06128402, JP 2000063732, JPH 1148416, JP 200045187, JPH 0932258, JPS 6092342 and JPH 09302903.

Standard rubber floor coverings are well known in public. The major advantages of such floor coverings are their dimensional stability, the absence of creeping and their relatively high resistance to abrasion.

Vulcanisable standard rubber floor covering compositions generally comprise less than 30% by weight of rubber internally mixed with about 60% by weight of fillers and less than about 10% by weight of vulcanisation agents and processing aids. Rubber floor coverings are known to be less tear and stain resistant than PVC floorings. Additionally, conventional PVC equipment cannot manage these compositions.

WO 2006/005752 discloses a large variety of possible compositions combining a series of elastomers, thermoplastics and a high styrene resin cured with conventional curing systems like N-tert-butyl-2-benzothiazolesulphenamide (TBBS), zinc dibenzyl dithiocarbamate (ZBEC), N-cyclohexylbenzothiazole-2-sulfenamide (CBS), sulphur, stearic acid and zinc oxide. The composition disclosed in the examples cannot be extruded on conventional PVC extruders. Furthermore, the obtained granules have a strong tendency to agglomerate in the transport containers. An additional drawback is the high production cost.

EP 1 361 249 B1 discloses a substantially halogen-free thermoplastic elastomer composition for decorative surface coverings comprising a dynamically vulcanised blend of epoxydized rubbers such as natural rubber, ethylene-propylene-diene-rubber (EPDM), acrylonitrile-butadiene-rubber (NBR) and styrene-butadiene-rubber (SBR), ionomers and diluent polymers such as ethylene vinyl acetate (EVA). The combination produces a pliable and flexible flooring product.

US 2002/0168500 A1 discloses an electrically conductive floor covering comprising at least two layers bonded to one another, including a bottom layer of electrically conductive rubber arranged under a light-coloured top layer of rubber, wherein the top layer is produced from a powder of first particles that are light in colour and made of electrically insulating rubber, and second particles embedded therein, which are made of electrically conductive, at least partially vulcanised rubber; the first and the second particles are pressed together and to the bottom layer and bonded by vulcanisation. First and second particles, both use a combination of a high styrene resin (HSR) and styrene-butadiene-rubber (SBR)

WO 2008/083973 discloses a decorative surface covering obtainable by a vulcanisable composition, said composition comprising a first polymer component consisting of styrene butadiene styrene block copolymer (SBS); a second polymer component selected from the group consisting of a random or partially random copolymer of butadiene and styrene (SBR) and acrylonitrile butadiene rubber (NBR); a third polymer component consisting of a high styrene content styrene butadiene copolymer (HSR), a filler, a vulcanisation system and additives selected from the group consisting of processing aids, stabilizers, pigments and compatibilizers.

EP 1 389 519 B1 discloses a process for providing a covering, such as a flooring, the said process comprising the operations of: feeding an extruder with strips of vulcanisable elastomer material of different colour, subjecting said material to extrusion, followed by shredding to form a granular material, subjecting said granular material to mixing until it is rendered substantially homogeneous; feeding said granular material, rendered homogeneous by mixing, to a calender, by direct feeding by gravity into the gap between the rollers of the calender so as to obtain, as a result of calendering, a strip of vulcanisable elastomer material; and subjecting said material in the form of a strip to vulcanisation.

Vulcanisation increases the complexity of the production process and renders recycling of the final product more difficult.

AIM OF THE INVENTION

It is the aim of the present invention to provide a halogen-free decorative substrate, with the same properties as the PVC decorative substrates, which properties are obtained without vulcanisation step. It is also the purpose of the present invention to provide a halogen-free composition which can be converted to halogen-free decorative substrates according to a process enabling the use of existing PVC production equipment.

SUMMARY OF THE INVENTION

The present invention discloses a halogen-free decorative surface (floor wall or ceiling) covering composition comprising a polymer blend, the polymer blend comprising:
  a) at least one thermoplastic elastomer, the thermoplastic elastomer being a block copolymer comprising hard and soft sequences, wherein the hard sequence is a (co)polymer of one or more vinyl aromatic monomer(s) and wherein the soft sequence is a (co)polymer of one or more alkylene(s) or of a mixture of one or more alkylene(s) and one or more vinylaromatic monomers;
  b) at least one thermoplastic polyurethane.

Preferred embodiments of the present invention disclose one or more of the following features:
  the at least one thermoplastic elastomer (a) comprises between 10 and 70% by weight, preferably between 10 to 60% by weight, more preferably between 20 and 60% by weight of hard sequences,
  the at least one thermoplastic elastomer (a) comprises from 30 to 90% by weight, preferably from 40 to 80% by weight, more preferably from 50 to 70% by weight of at least one vinyl aromatic monomer.
  the at least one thermoplastic elastomer (a) is selected from the group consisting of styrene-butadiene-styrene, styrene-isoprene-styrene, styrene-isobutylene-styrene, styrene-ethylene-butylene-styrene and styrene-ethylene-propylene-styrene.
  the at least one thermoplastic polyurethane (b) comprises an aromatic thermoplastic polyurethane.
  the halogen-free decorative surface covering composition comprises from 25 and 70% by weight, preferably from 30 to 60% by weight, more preferably from 40 to 50% by weight of the polymer blend, the polymer blend comprising from 60 to 20% by weight, preferably from 50 to 30% by weight of thermoplastic elastomer (a) and from 40 to 80% by weight, preferably from 50 to 70% by weight of thermoplastic polyurethane (b), the sum of (a) and (b) being 100%.
  the halogen-free decorative surface covering composition comprises from 20 to 70% by weight, preferably from 30 to 60% by weight, more preferably from 40 to 50% by weight of one or more filler(s) and from 0.1 to 10% by weight, preferably from 0.2 to 8% by weight, more preferably from 0.3 to 6% by weight of the one or more pigments and/or dyes.
  the halogen-free decorative surface covering composition comprises from 0.5 to 5% by weight, preferably from 1.5 to 4.5% by weight, more preferably from 2 to 4% of one or more silicones selected from the group consisting of the siloxane homopolymers or copolymers comprising dimethylsiloxane units, methylhydrogen siloxane units, diphenylsiloxane units, phenylmethylsiloxane units, dimethylhydrogen siloxane units and trimethylsiloxane units.

Preferably, the thermoplastic elastomer (a) and the thermoplastic polyurethane (b) together constitute 100% of the polymer blend.

Preferably, the halogen-free decorative surface covering composition comprises from 25 and 70% by weight of the polymer blend, the polymer blend comprising from 60 to 20% by weight, preferably from 50 to 30% by weight of thermoplastic elastomer (a) and from 40 to 80% by weight, preferably from 50 to 70% by weight of thermoplastic polyurethane (b), the sum of (a) and (b) being 100%, the composition comprising between 30 and 75% by weight of one or more ingredients selected from the group consisting of lubricants, compatibilizers, silicones, antioxidants, fillers, pigments, dyes and additives, the polymer blend and the one or more ingredients together constituting 100% of the composition.

The present invention further discloses a process for the preparation of a halogen-free decorative surface covering, comprising the steps of:
  a) providing a plurality of single coloured strands by mixing and compounding the different components of each single colour composition;
  b) granulating each single coloured strand separately to form single coloured granules or merging the plurality of single coloured strands and granulating the merging outcome to form multi coloured granules;
  c) converting the single or multi coloured marbled granules into a multi coloured halogen-free surface covering preferably by means of calendering or pressing.

Preferred embodiments of the process for the preparation of the halogen-free decorative surface covering disclose one or more of the following features:
  the compounding step a) is performed at a temperature comprised between 140 and 220° C., preferably between 150 and 200° C., more preferably between 160 and 190° C.;
  the merging outcome of step b) is obtained from calendering or extruding the plurality of single coloured strands;
  the calendering in step b) is performed at a temperature comprised between 110 and 160° C., preferably between 120 and 150° C., more preferably between 130 and 140° C.;
  the extruding in step b) is performed at a temperature comprised between 40 and 150° C. preferably between 80 and 150° C. more preferably between 100 and 140° C.;
  the belt press of step c) operates at:
    a temperature comprised between 130 and 220° C., preferably between 150 and 210° C., more preferably between 170 and 200° C.;
    a speed comprised between 2 and 25 m/min, preferably between 10 and 18 m % min, more preferably between 12 and 16 m/min.
    a pressure comprised between 3 and 20 bar, preferably between 5 and 18 bar, more preferably between 8 and 15 bar;

the calender of step c) operates at:
- a temperature comprised between 130 and 220° C., preferably between 150 and 210° C., more preferably between 170 and 200° C.;
- a speed comprised between 2 and 25 m/min, preferably between 10 and 18 m/min, more preferably between 12 and 16 m/min.

the multi coloured halogen-free surface covering is contacted, in an additional step, with a topcoat layer the topcoat layer comprising a cross-linked material;

the topcoat layer is obtained from curing a radiation curable coating composition, the radiation curable composition comprising ethylenically unsaturated acrylic, ester, ether or urethane comprising polymers, oligomers or monomers.

DETAILED DESCRIPTION OF THE INVENTION

Decorative surface coverings include any design covering such as floor-, wall- and ceiling coverings.

The decorative surface coverings of the present invention are substantially halogen free what the expression "halogen free" has to be understood as devoid of any halogen comprising polymers, without excluding the presence of halogen comprising impurities or halogen comprising additives present in a concentration of less than 1 percentage.

The decorative surface coverings of the present invention comprise a blend of one or more thermoplastic elastomer and one or more thermoplastic polyurethanes.

The one or more thermoplastic elastomers are block copolymers comprising hard and soft blocks, wherein the hard blocks are obtained from the polymerisation of one or more vinyl aromatic monomer(s) and wherein the soft blocks are obtained from polymerisation of one or more alkylene(s) or the copolymerisation of one or more alkylene(s) and one or more vinyl aromatic monomer(s).

The vinyl aromatic monomer is selected from the group consisting of styrene and α-methyl styrene wherein the benzene ring may be substituted by one to three (C1-C4) alkyls, preferably methyl or ethyl groups or vinylnaphthalene optionally substituted by one or more methyl or ethyl groups.

The vinyl aromatic monomer preferably is selected from the group consisting of styrene, α-methyl styrene and vinyl toluene. The vinyl aromatic monomer more preferably is styrene.

The alkylene preferably is selected from the group consisting of ethylene, propylene, butylene, pentene, hexane, octane, butadiene, isoprene, 1,3-pentadiene, 2,3-dimethyl-1,3-butadiene, pyperylene, 2,4-hexadiene, 3-butyl-1,3-octadiene and phenyl-1,3-butadiene. The alkylene more preferably is butadiene or isoprene.

The thermoplastic elastomers of the present invention can be in the form of a linear diblock, triblock and multiblock copolymer or in the form of radial block copolymers. A mixture of linear and radial block copolymers can also be used according to the present invention.

The soft blocks of the thermoplastic elastomer preferably contains a total alkylene monomer which is more than 50% a mole, preferably at least 70% mole, the remaining portion, if any, consisting of other copolymerizable monomers such as vinylaromatic monomers.

The thermoplastic elastomer of the present invention preferably comprises between 10 and 70% by weight, more preferably between 10 and 60% by weight, most preferably between 20 and 50% by weight of hard blocks.

The thermoplastic elastomer of the present invention preferably comprises of from 30 to 90% by weight, preferably of from 40 to 80% by weight, more preferably of from 50 to 70% by weight of at least one vinyl aromatic monomer.

The hard blocks are characterized by a glass transition temperature which is higher than the service temperature; the soft blocks are characterized by a glass transition temperature which is lower than the service temperature and which is preferably comprised between 20 and −110° C., preferably between −10 and −100° C., more preferably between −20 and −90° C.

The soft blocks of the thermoplastic elastomer may be partially or fully hydrogenated.

The weight average molecular weight of the thermoplastic elastomer preferably ranges from 100,000 to 500,000 g/mole, more preferably from 150,000 to 400,000 g/mole.

The thermoplastic elastomer of the present invention preferably is selected from the group consisting of styrene-butadiene-styrene, styrene-isoprene-styrene, styrene-isobutylene-styrene, styrene-ethylene-butylene-styrene and styrene-ethylene-propylene-styrene.

The thermoplastic elastomer preferably is a styrene-butadiene-styrene block copolymer.

Examples of thermoplastic elastomers suitable for being used in the blend of the present invention include Europrene (Polimeri Europe), Kraton (Kraton Performance Polymers Inc.), Stereon (Firestone Polymers), Styroflex (Styrolution), Finaprene (Total Petrochemicals), Tufprene (Asahi Kasei Corp) and Laprene and Soprene (So.F.Ter group).

The thermoplastic polyurethane are obtained from reaction of a diisocyanate compound with at least one difunctional compound capable of reacting with an isocyanate group, preferably at least one difunctional hydroxyl group comprising compound and optionally a chain extender.

The diisocyanate compound may be aromatic or aliphatic.

Aromatic diisocyanates include, for example, 4,4'-, 2,2'- and 2,4'-methylene diphenyl diisocyanate and toluene diisocyanate; aliphatic diisocyanates include, for example, 1,6-hexamethylene diisocyanate, isophorone diisocyanate and 2,2'-, 4,4'- and 2,4'-dicyclohexylmethane diisocyanate. Mixtures of aromatic and aliphatic diisocyanates may be used.

Preferred are isocyanate compositions comprising aromatic diisocyanates and more preferably methylene diphenyl diisocyanate.

The difunctional compound capable of reacting with an isocyanate group preferably is a difunctional hydroxyl group comprising compound and may be selected from derivatives of polyesteramides, polythioethers, polycarbonates, polyacetals, polyolefins, polysiloxanes, polyesters, polyethers, polycaprolactone and mixtures thereof. Polyesters, polyethers, polycaprolactone are preferred.

Suitable chain extenders include aliphatic diols such as 1,4-butanediol or 1,6-hexanediol or aminoalcohols such as N-methyldiethanolamine.

The weight average molecular weight of the thermoplastic polyurethane preferably ranges from 50,000 to 400,000 g/mole, more preferably from 75,000 to 200,000 g/mole.

Examples of thermoplastic polyurethanes suitable for being used in the blend of the present invention include Epamould (Epaflex Polyurethanes), Laripur (Coim S.p.A.), Apilon (Api Plastic S.p.A.), Estane and Pearlcoat/Pearlthane (Lubrizol), Avalon (Huntsman Polyurethanes), Elastollan (BASF) and Pellethane (Dow Chemical Co).

The decorative surface coverings of the present invention are obtained from processing a composition comprising from 30 and 60% by weight, preferably from 35 to 55% by weight, more preferably from 40 to 50% by weight of the polymer blend comprising the above specified thermoplastic elastomer and thermoplastic polyurethane said polymer blend comprising between 40 and 80% by weight of thermoplastic polyurethane and between 60 and 20% by weight of thermoplastic elastomer. Preferably the polymer blend comprises between 50 and 70% by weight of thermoplastic polyurethane and between 50 and 30% by weight of thermoplastic elastomer.

Preferred compositions according to the present invention further comprise ingredients such as lubricants, compatibilizers, silicones, antioxidants, fillers and pigments or dyes.

Examples of suitable lubricants are of the stearic acid type, the fatty acid ester type, the fatty acid amide type, the paraffin hydrocarbon type, the napthenic hydrocarbon type, the metal soap type, the silicone type, polyethylene glycol type and waxes, used alone or as a mixture.

Preferred lubricants include stearic acid and zinc stearate.

Examples of suitable compatibilizers include ethylene/alkyl acrylate copolymers, ethylene/alkyl acrylate/carbon monoxide copolymers, ethylene/alkyl acrylate/carbon monoxide copolymers grafted with carboxylic acid anhydride groups, ethylene/alkyl acrylate/mono methyl maleate copolymers, ethylene/alkyl acrylate copolymers grafted with carboxylic acid anhydride groups, ethylene/vinyl acetate copolymers, ethylene/vinyl acetate copolymers grafted with carboxylic acid anhydride groups, ethylene/vinyl acetate/carbon monoxide copolymers; ethylene/vinyl acetate/carbon monoxide copolymers grafted with carboxylic acid anhydride groups and block copolymers comprising one or more alkylene(s) and one or more vinyl aromatic monomer(s) and grafted with carboxylic acid anhydride groups.

Examples of silicones are polysiloxanes including polymers and copolymers comprising dimethylsiloxane units, methylhydrogensiloxane units, diphenylsiloxane units, phenylmethylsiloxane units, dimethylhydrogensiloxane units and trimethylsiloxane units.

A preferred silicone is polydimethylsiloxane.

Examples of suitable antioxidants include phenolic and thioester antioxidants. The antioxidants may be used alone or in combination. Preferred antioxidants are pentaerythritol tetrakis(3-(3,5-di-tert-butyl-4-hydroxyphenyl)propionate) (Irganox 1010) and octadecyl 3-(3,5-di-tert-butyl-4-hydroxyphenyl)propionate (Irganox 1076), both available from BASF.

Examples of fillers suitable for the composition of the present invention can be any conventional filler, especially those types traditionally used in surface coverings.

The filler can be organic, inorganic, or a combination of both, such as with different morphologies. Examples include, but are not limited to, coal fly ash, carbonate salts such as magnesium carbonate, calcium carbonate and calcium-magnesium carbonate, barium sulfate, carbon black, metal oxides, inorganic material, natural material, alumina trihydrate, magnesium hydroxide, bauxite, talc, mica, dolomite, barite, kaolin, silica, post-consumer glass, or post-industrial glass, synthetic and natural fiber, or any combination thereof.

Preferably the filler comprises talc, mica, calcium carbonate, barite, kaolin, bauxite, dolomite, silica, glass, or any combination thereof.

Examples of pigments and dyes suitable for the composition of the present invention are metallic oxides such as titanium dioxide, iron oxide, zinc oxide and the like, metal hydroxides, metal powders, sulphides, sulphates, carbonates, silicates, iron blues, organic reds, organic maroons and the like.

The compositions according to the present invention can optionally contain one or more additives, such as, modifying resins, cross-linking agents, stabilizer, foaming agents, tackifiers, dispersion agents and/or other conventional organic or inorganic additives commonly used in polyolefin or in other surface coverings, such as, but not limited to, UV-stabilizers, antistatic agents, thermal and light stabilizers, flame retardants, or any combination thereof.

Preferably the composition includes at least one pigment, flame retardant, thermal stabilizer, light stabilizer, antistatic agent, or any combination thereof.

According to a first aspect of the present invention a decorative surface covering, more particularly floor and wall covering is provided.

The decorative surface covering of the present invention comprises:
  from 25 and 70% by weight, preferably from 30 to 60% by weight, more preferably from 40 to 50% by weight of the polymer blend comprising one or more thermoplastic elastomer(s) and one or more thermoplastic polyurethane(s);
  from 2 to 8% by weight, preferably from 3 to 7% by weight, more preferably from 4 to 6% by weight of one or more compatibilizer(s);
  from 0.1 to 1.1% by weight, preferably from 0.3 to 0.9% by weight, more preferably from 0.5 to 0.7% by weight of one or more of the above lubricant(s);
  from 0.5 to 5% by weight, preferably from 1.5 to 4.5% by weight, more preferably from 2 to 4% by weight of one or more silicone(s);
  from 0.1 to 1% by weight, preferably from 0.15% to 0.7% by weight, more preferably from 0.2 to 0.5% by weight of one or more antioxidant(s);
  from 20 to 70% by weight, preferably from 30 to 60% by weight, more preferably from 40 to 50% by weight of one or more filler(s);
  from 0.1 to 10% by weight, preferably from 0.2 to 8% by weight, more preferably from 0.3 to 6% by weight of the one or more pigments and/or dyes;
  from 0 to 5% by weight, preferably from 0.1 to 4% by weight, more preferably from 0.3 to 5% by weight of the one or more additive(s),
based on the total weight of the composition.

According to a second aspect of the present invention a method for producing said decorative surface coverings is provided.

The method comprises:
  mixing the components of the composition,
  compounding the component-mix and providing a single coloured compound in strand form,
  repeating the mixing and compounding step for a plurality of compositions, wherein each of said compositions may be different.

By a different composition the present invention means a composition differing from another composition by the type and the quantity of one or more ingredients (thermoplastic elastomer(s), thermoplastic polyurethane(s), compatibilizer(s), silicone(s), lubricant(s), antioxidant(s), filler(s), pigment(s), dye(s) and additive(s))

The steps of mixing and compounding are repeated wherein different pigmentations result in a plurality of single coloured compounds in sheet form.

Mixing generally is performed in a Banbury mixer, continuous mixer, a ribbon mixer or any combination thereof to form a blend.

Compounding generally is performed in an extruder at a temperature comprised between 140 and 220° C., preferably between 150 and 200° C., more preferably between 160 and 190° C.

A first embodiment of the method of the present invention comprises the further steps of:
- granulating each single coloured strand separately to form single coloured granules,
- scattering single coloured granules of different colour on a steel belt in a belt press, preferably a double belt press, or feeding them to a calender,
- converting the granules in a multi coloured sheet.

A second embodiment of the method of the present invention comprises the further steps of:
- merging the plurality of single coloured strands by calendering to form a multilayer sheet,
- granulating the resulting multilayer sheet to form multi coloured granules,
- scattering multi coloured granules on a steel belt in a belt press, preferably a double belt press, or feeding them to a calender,
- converting the granules in a multi coloured sheet.

A third embodiment of the method of the present invention comprises the further steps of:
- merging the plurality of single coloured strands by calendering to form a multi coloured marbled sheet,
- granulating the resulting multi coloured marbled sheet to form multi coloured marbled granules,
- scattering multi coloured marbled granules on a steel belt in a belt press, preferably a double belt press, or feeding them to a calender,
- converting the granules in a multi coloured sheet.

A fourth embodiment of the method of the present invention comprises the further steps of:
- merging the plurality of single coloured strands by a granulating extruder to form multi coloured marbled granules,
- scattering multi coloured marbled granules on a steel belt in a belt press, preferably a double belt press, or feeding them to a calender,
- converting the granules in a multi coloured sheet.

The calendering step, prior to the granulating step, is performed at a temperature comprised between 110 and 160° C., preferably between 120 and 150° C., more preferably between 130 and 140° C.

The speed of the rollers in general is comprised between 2 and 15 m/min, preferably between 4 and 12 m/min, more preferably between 6 and 10 m/min.

The granulating extruder step is performed at a temperature comprised between 40 and 150° C., preferably between 80 and 150° C., more preferably between 100 and 140° C. The speed of the screw in general is comprised between 10 and 30 rpm, preferably between 16 and 25 rpm, more preferably between 18 and 25 rpm.

In each of the embodiments one to four, conversion of the granules into a multi coloured sheet is done under the following operation conditions:
- the temperature of the belt press or the calender is comprised between 130 and 220° C., preferably between 150 and 210° C., more preferably between 170 and 200° C.,
- the speed of the belt press or the calender is comprised between 2 and 25 m/min, preferably between 10 and 18 m/min, more preferably between 12 and 16 m/min,
- the pressure of the belt press is comprised between 3 and 20 bar, preferably between 5 and 18 bar, more preferably between 8 and 15 bar, Further the method of the present invention comprises the additional step of providing a topcoat on the multi coloured sheet, wherein the topcoat is a cross-linked layer, preferably obtained by subjecting a radiation curable coating composition to actinic irradiation.

The radiation curable coating composition in general comprises ethylenically unsaturated acrylic, ester, ether or urethane comprising polymers, oligomers or monomers and may be organic solvent free or water-borne.

The process for contacting radiation curable coating composition with the multi-coloured marble sheet comprises any liquid coating application technique, known in the art, such as curtain coating, roller application or spray coating.

The properties of the decorative surface coverings of the present invention are comparable or these of conventional PVC-based decorative surface coverings.

On the other hand, the decorative surface coverings of the present invention have properties which are comparable to or superior than the currently existing PVC-free decorative surface coverings.

The decorative surface coverings of the present invention can be produced on existing equipment intended for the production of PVC comprising surface coverings.

They prove outstanding scratch and scuff resistance, form stability (creep) and are approved for wet room installations. They are easy to maintain and dry buff and is moreover easily recyclable due to the absence of a vulcanisation step.

EXAMPLES

The following illustrative examples are merely meant to exemplify the present invention but is not destined to limit or otherwise define the scope of the present invention.

The compositions, according to the formulation as given in table 1 to 5, were melt-mixed in an extruder at a temperature of about 170° C. delivering a single coloured compound in strand form.

TABLE 1

|  | Constituent | % by weight |
|---|---|---|
| Thermoplastic elastomer | Calprene C-540 | 20.0 |
| Thermoplastic polyurethane | Pearlcoat 163K | 25.0 |
| Compatibilizer | Fusabond N525 | 5.0 |
| Filler | Alrimal 447 S | 44.0 |
| Silicone | Rhodorsil 30.000 | 3.0 |
| Antioxidant | Irganox 1010 | 0.3 |
| Lubricant | Ligastar ZN101/6 | 1.6 |
| Pigment | Titanium dioxide | 1.1 |

TABLE 2

|  | Constituent | % by weight |
|---|---|---|
| Thermoplastic elastomer | Europrene SOL T 6414 | 20.0 |
| Thermoplastic polyurethane | Elastollan 1185A10 | 20.0 |
| Compatibilizer | Kraton FG1901 | 10.0 |
| Filler | Afrimal 447 S | 28.0 |
|  | Myanit A10 | 10.0 |
|  | Reasorb 90 | 6.0 |
| Silicone | Rhodorsil 30.000 | 3.0 |
| Antioxidant | Irganox 1076 | 0.3 |
| Lubricant | Ligastar ZN101/6 | 1.6 |
| Pigment | Titanium dioxide | 1.1 |

TABLE 3

| Constituent | | % by weight |
|---|---|---|
| Thermoplastic elastomer | Finaclear 602 D | 35.0 |
| Thermoplastic polyurethane | Pearlcoat 127K | 10.0 |
| Compatibilizer | Kraton FG1901 | 5.0 |
| Filler | Martinal ON313 | 44.0 |
| Silicone | Rhodorsil 30.000 | 3.0 |
| Antioxidant | Irganox 1076 | 0.5 |
| Lubricant | Ligastar ZN101/6 | 1.4 |
| Pigment | Titanium dioxide | 1.1 |

TABLE 4

| Constituent | | % by weight |
|---|---|---|
| Thermoplastic elastomer | Tufprene A | 35.0 |
| Thermoplastic polyurethane | Pearlcoat 127K | 10.0 |
| Compatibilizer | Fusabond C250 | 5.0 |
| Filler | Martinal OL104 LEO | 44.0 |
| Silicone | Rhodorsil 30.000 | 3.0 |
| Antioxidant | Irganox 1010 | 0.5 |
| Lubricant | Ligastar ZN101/6 | 1.4 |
| Pigment | Titanium dioxide | 1.1 |

TABLE 5

| Constituent | | % by weight |
|---|---|---|
| Thermoplastic elastomer | Calprene C-540 | 5.0 |
| Thermoplastic polyurethane | Pearlcoat 163K | 40.0 |
| Compatibilizer | Kraton FG1901 | 5.0 |
| Filler | Afrimal 447 S | 27.0 |
| | Myanit A10 | 10.0 |
| | Reasorb 90 | 7.0 |
| Silicone | Rhodorsil 30.000 | 3.0 |
| Antioxidant | Irganox 1076 | 0.5 |
| Lubricant | Ligastar ZN101/6 | 1.4 |
| Pigment | Titanium dioxide | 1.1 |

In these tables Calprene® C540 is a linear styrene/butadiene/styrene block copolymer from Dynasol; Europrene® SOL T6414 is a radial styrene butadiene block copolymer from Polimeri Europa; Finaclear® 602 D is a styrene/butadiene/styrene block copolymer from Total Petrochemicals; Tufprene® A is a styrene/butadiene block copolymers from Asahi Kasei; Pearlcoat® 163K is a polyether based thermoplastic polyurethane from Lubrizol; Pearlcoat®, 127K is a polyester-based thermoplastic polyurethane from Lubrizol; Elastollan 1185A 10 is an aromatic thermoplastic polyether polyurethane from BASF; Fusabond® N525 is an anhydride modified ethylene copolymer from Dupont; Fusabond® C250 is a modified ethylene vinyl acetate copolymer from Dupont; Kraton® FG1901 G is a linear triblock copolymer based on styrene and ethylene/butylene comprising maleic anhydride from Kraton; Afrimal 447 S is aluminumhydroxide from Alpha Calcit; Myanit A 10 is medium particle size dolomite from Omya; Reasorb 90 is calcium carbonate from Omya; Martinal ON 313 and Martinal® OL 104 LEO is aluminumhydroxide from Albemarle; Rhodorsi® 47 V30.000 is polydimethylsiloxane from Clearco Products; Irganox 1010 and Irganox 1076 is a sterically hindered phenolic antioxidant from Ciba Specialty Chemicals; Ligastar Zn 101/6 is zinc stearate from Peter Greven and titanium dioxide is from Sachtleben.

For the respective compositions of table 1 to 5, except for the pigment (titanium dioxide), three strands of different colour, were prepared and subsequently granulated and calendered in a roller mill at a temperature of 134° C. and a roller speed of 10 m/min. to form marbled sheets 1 to 5.

Each thus obtained sheet was then granulated to obtain multi coloured marbled granules of suitable sizes (e.g. 0.1 to 40 mm). The granules were scattered on the steel belt in a double belt press, wherein the double belt press operates at a temperature of 185° C., a pressure of 18 bar and a belt speed of 12 m/min., and pressed to a multi coloured, sheet.

The respective multi coloured sheets 1 to 5, then were subjected to partially specific testing methods of the inventor that can be shortly described as follows:

Scratch Resistance

The apparatus with the scratching tool is placed over the sample so that a wagon can be pulled across the surface. The applied force starts with 0.5N and increase 0.5N each time until a scratch appears. The results are expressed as load (N) resulting in a scratch that can be seen (=visual) and load (N) resulting in a scratch that can be felt (feeling).

Friction

Friction is measured with a modified Tortus friction tester. Instead of using the measuring foot, a sled is fastened to the machine by a line. The force required to drag the sled over the surface of the sample with the motor of the machine is recorded as the friction value.

Soiling and Cleaning

A flooring sample is placed inside a drum with the wear surface exposed. A rubber-coated tetrahedron (or tetrapod) weight and a soiling compound are added and are tumbled as the drum rotates 1000 revolutions.

After the soiling and scratching of the surface, loose dirt is wiped off by using a paper tissue.

The test material is laid flat and fixed to the sample holders on the moving board of the cleaning device.

The cleaning procedure simulates cleaning/washing by machine. The cleaning is carried out with a detergent dissolved in water. The rotating cleaning pad passes over the surface 6 times.

The test results are visually evaluated by using a grey scale and ranked according to the degree of soiling and scratching. The results are described on a scale from 0 to 5, wherein 0 stands for severe damage while 5 stands for no visible change.

Fire Retardance

The fire retardance is based on the radiant panel test EN ISO 9239-1, wherein a test specimen is placed horizontally below a gas-fired radiant panel inclined at 30°. The specimen is exposed to a defined field of total heat flux, 11 kW/m2 at the hotter end close to the radiant panel, and decreasing to 1 kW/m2 at the other end farther away from the radiant panel.

A pilot flame front from a line burner is applied to the hotter end in order to ignite the specimen.

The progress of the flame front along the length of the specimen is recorded in terms of the time it takes to travel to various distances. The smoke development during the test is measured on the basis of light obscuration by smoke in the exhaust duct. The duration of the test is 30 minutes.

The classification criterion is the critical heat flux (CHF) defined as the radiant flux at which the flame extinguishes or the radiant flux after a test period of 30 minutes, whichever is lower. In other words, CHF is the flux corresponding to the furthest extent of spread of flame.

In this test BFL stands for a critical flux ≥8.0 kW·m-2; CFL stands for a critical flux ≥4.5 kW·m-2; DFL stands for a critical flux ≥3.0 kW·m-2 and s1 stands for a smoke production ≤750%·minutes.

The test results for sheets 1 to 5, obtained from processing the compositions of table 1 to 5 respectively, are shown in table 6 and all are situated within the ranges as indicated in column 3 (Floor according to the invention)

TABLE 6

| Scratch Resistance | Rubber Floor | Floor according to the invention | Demands |
|---|---|---|---|
| Visual (N) | 1 | 2.5-3 | ≥2 |
| Feeling (N) | 2 | 4-5 | ≥3 |
| Friction | 2.3-2.6 | 1.5-2.0 | 1.3-2 |
| Soiling and Cleaning | 4 | 4-5 | 3 |
| Fire Retardance | $C_{FL}$ s1 | $B_{FL}$ s1 | $C_{FL}$ s1 |

Dry Buffing

In order to judge dry maintenance performance of a floor material evaluation of the result of dry buffing is very appropriate. Dry buffing is the most efficient method to use to restore the floor's surface once wear has become visible. As the pad of the dry buffing consists of non-woven fiber and resinous binder in which abrasive particles may or may not be distributed, frictional heat is produced by frictional rubbing of the pad on floor's surface, thus removing completely or partially most of the wear indicators. It is best to dry-buff right after the floor has been machine cleaned. Dry buffing limits renewed soiling. Best result is obtained by 500 to 1500 rpm and the use of a red pad.

Dry buffing was performed using a high speed Clean Star D-430 buffing machine manufactured by Amano. Colour change, gloss, abrasion and blister on the surface layer were examined after one, two or three times of a 20 second dry buffing. The gloss of the floor material of the present invention was markedly increased with the number of polishing times. In addition, the procedure caused no changes in colour, generated no obvious abrasion and formed no blisters, thus showing the markedly excellent dry maintenance performance by a high speed buffing machine.

The decorative floor coverings, processed from the compositions of the present invention, are characterized by an improved processability compared to rubber flooring: as a result of the absence of the vulcanisation step, a process characterized by more flexibility in process temperatures and melt viscosity is feasible. Because no vulcanisation is performed, the decorative surface coverings of the present invention are about 100% recyclable.

The invention claimed is:

1. Process for the preparation of a halogen-free decorative surface covering, comprising the steps of:
   i. providing a plurality of single coloured strands, each single coloured strand comprising a polymer blend, which comprises:
      a) at least one thermoplastic elastomer, said thermoplastic elastomer being a block copolymer comprising hard and soft sequences, wherein the hard sequence is a (co)polymer of one or more vinyl aromatic monomer(s) and wherein the soft sequence is a (co)polymer of one or more alkylene(s) or of a mixture of one or more alkylene(s) and one or more vinylaromatic monomers;
      b) at least one thermoplastic polyurethane;
   ii. granulating each single coloured strand separately to form single coloured granules or merging the plurality of single coloured strands and granulating the merging outcome to form multi coloured marbled granules;
   iii. converting said single or multi coloured marbled granules into a multi coloured halogen-free surface covering.

2. The process according to claim 1 wherein the each single coloured strand is provided by mixing and compounding components of the polymer blend, wherein the compounding is performed at a temperature comprised between 140 and 220° C.

3. The process according to claim 1 wherein the merging outcome of step ii) is obtained from calendering or extruding the plurality of single coloured strands.

4. The process according to claim 1 wherein the calendering in step ii) is performed at a temperature comprised between 110 and 160° C.

5. The process according to claim 1 wherein the extruding in step ii) is performed at a temperature comprised between 40 and 150° C.

6. The process according to claim 1 wherein step iii) comprises pressing using a belt press and wherein the belt press operates at:
   a temperature comprised between 130 and 220° C.;
   a speed comprised between 2 and 25 m/min, preferably between 10 and 18 m/min;
   a pressure comprised between 3 and 20 bar.

7. The process according to claim 1 wherein step iii) comprises calendering using a calender, and wherein the calender operates at:
   a temperature comprised between 130 and 220° C.;
   a speed comprised between 2 and 25 m/min.

8. The method according to claim 1 comprising the additional step of contacting the multi coloured halogen-free surface covering with a topcoat layer said topcoat layer comprising a cross-linked material.

9. The method according to claim 1, wherein the topcoat layer is obtained from curing a radiation curable coating composition, said radiation curable composition comprising ethylenically unsaturated acrylic, ester, ether or urethane comprising polymers, oligomers or monomers.

10. The method according to claim 1, wherein the at least one thermoplastic elastomer (a) comprises between 10 and 70% by weight.

11. The method according to claim 1, wherein the at least one thermoplastic elastomer (a) comprises from 30 to 90% by weight of at least one vinyl aromatic monomer.

12. The method according to claim 1, wherein the at least one thermoplastic elastomer (a) is selected from the group consisting of styrene-butadiene-styrene, styrene-isoprene-styrene, styrene-isobutylene-styrene, styrene-ethylene-butylene-styrene and styrene-ethylene-propylene-styrene.

13. The method according to claim 1, wherein the at least one thermoplastic polyurethane (b) comprises an aromatic thermoplastic polyurethane.

14. The method according to claim 1, wherein each single coloured strand comprises from 25 and 70% by weight of the polymer blend, said polymer blend comprising from 60 to 20% by weight of thermoplastic elastomer (a) and from 40 to 80% by weight, preferably from 50 to 70% by weight of thermoplastic polyurethane (b), the sum of (a) and (b) being 100%.

15. The method according to claim 1, wherein each single coloured strand comprises from 20 to 70% by weight of one or more filler(s) and from 0.1 to 10% by weight of the one or more pigments and/or dyes.

16. The method according to claim 1, wherein each single coloured strand comprises from 0.5 to 5% by weight of one or more silicones selected from the group consisting of the siloxane homopolymers or copolymers comprising dimethylsiloxane units, methylhydrogen siloxane units, diphenylsiloxane units, phenylmethylsiloxane units, dimethylhydrogen siloxane units and trimethylsiloxane units.

17. The method according to claim 1, wherein said thermoplastic elastomer (a) and said thermoplastic polyurethane (b) together constitute 100% of said polymer blend.

18. The method according to claim 14, wherein each single coloured strand comprises between 30 and 75% by weight of one or more ingredients selected from the group consisting of lubricants, compatibilizers, silicones, antioxidants, fillers, pigments, dyes and additives, wherein the polymer blend and the one or more ingredients together constitute 100% of each single coloured strand.

\* \* \* \* \*